United States Patent [19]
Wilkerson et al.

[11] Patent Number: 5,300,333
[45] Date of Patent: Apr. 5, 1994

[54] BIODEGRADABLE INSULATED FOOD CONTAINER

[75] Inventors: C. William Wilkerson, New Bern; William G. Head, III, Wrightsville Beach, both of N.C.

[73] Assignee: The Enbiomass Group, Inc., Wilmington, N.C.

[21] Appl. No.: 38,801

[22] Filed: Mar. 29, 1993

[51] Int. Cl.⁵ ............................................. B27N 5/02
[52] U.S. Cl. ................................... 428/35.6; 426/106; 426/115; 426/512; 426/516
[58] Field of Search ................. 428/35.6; 426/106, 138

[56] References Cited

U.S. PATENT DOCUMENTS 5,160,368 11/1992 Begovich ........................ 106/154.1

Primary Examiner—James J. Seidleck
Assistant Examiner—Mary Critharis
Attorney, Agent, or Firm—Rhodes, Coats & Bennett

[57] ABSTRACT

A biodegradable food container for holding and insulating food. The food container includes a wall structure constructed from heat-expanded grains bound together with a biodegradable bonding agent. In the preferred embodiment, the heat-expanded grains are popcorn and the bonding agent is a starch paste or other type of biodegradable bonding agent of food grade quality. The wall structure is formed by heating expandable grains to form the heat-expanded grains. The heat-expanded grains are then ground and mixed with the bonding agent to form a moldable popcorn mixture. The moldable popcorn mixture is molded to form a wall structure of a selected shape for holding and insulating food.

27 Claims, 4 Drawing Sheets

BIODEGRADABLE INSULATED FOOD CONTAINER

FIELD OF THE INVENTION

The present invention is related generally to food containers, and more particularly to biodegradable food containers.

BACKGROUND OF THE INVENTION

Prior art food containers are typically constructed from plastics, styrofoam, and other materials which are not biodegradable. These non-biodegradable food containers are widely used because they are relatively inexpensive to make, are easily formed into chosen shapes, and have excellent insulation characteristics. Despite making excellent containers during use, the fact that these prior art containers are non-biodegradable creates a serious waste disposal problem.

Used food containers made from plastics and styrofoam form waste which must be indefinitely stored in landfills. Nonbiodegradable food containers of the prior art fail to decompose in landfills and create waste storage problems. As the population and food consumption continues to grow, the problem of storing non-biodegradable waste, including food containers, will become an increasing problem. This is especially a serious problem in the fast food industry which sells large quantities of individually containerized food to the general public. The problem is so serious that at least one major fast food chain has discontinued use of styrofoam containers.

A food container is needed that is biodegradable and includes the characteristics of being a good insulator, inexpensive, and easily formed into selected shapes.

SUMMARY AND OBJECTS OF THE INVENTION

The present invention is a food container which is biodegradable to help eliminate waste disposal problems. The food container includes a wall structure which encloses a space for holding food. In one embodiment of the present invention the wall structure is formed to form a food container shaped to enclose and hold a hamburger or other similar food product.

Expandable grains that have been popped or expanded through heating and a biodegradable bonding agent for binding together heat-expanded grains are used to construct the wall structure. In the preferred embodiment, the heat-expanded grains are popcorn. The use of popcorn, and other heat-expanded grains, as one of the components to form the wall structure helps improve the insulation of the food container. Popcorn has air interspersed throughout the popcorn and this air becomes trapped within the wall structure to help improve overall insulation of the food container. The bonding agent is used to bind the popped popcorn together in spaced relation to form a popcorn mixture which is easily formed into a selected food container shape. The bonding agent and popcorn are also both suitable for direct contact with the food they are designed to hold.

In the preferred embodiment, the food container is constructed by heating corn kernels to form popcorn. The popcorn is then ground to form a multiplicity of popcorn beads. The popcorn beads are processed to remove the popcorn husks and to form a mixture of uniformly sized popcorn beads formed from the endosperm of the popcorn. The popcorn beads are then combined with a biodegradable bonding agent to form a popcorn/bonding agent mixture of spaced popcorn beads connected together by the bonding agent. The moldable popcorn mixture is then formed into a selected container shape for holding and insulating food.

Because both popcorn and the bonding agent are relatively low-cost items, the food container of the present invention can be inexpensively manufactured. In addition, the use of popcorn and a bonding agent results in the container being easily formed, lightweight and a good insulator for heated or chilled food contained within the container.

Accordingly, it is an object of the present invention to provide a biodegradable food container which is easily formed.

Another object of the present invention is to provide a biodegradable food container that has good insulating characteristics.

Another object of the present invention is to provide a biodegradable food container that is lightweight.

Another object of the present invention is to provide a biodegradable food container that is inexpensive.

Another object of the present invention is to design a biodegradable food container having a wall structure which has a food grade quality so as to be suitable for direct contact with foods.

Other objects and advantages of the present invention will become apparent and obvious from a study of the following description and the accompanying drawings which are merely illustrative of such invention.

DETAILED DESCRIPTION OF THE INVENTION

Figure 1:
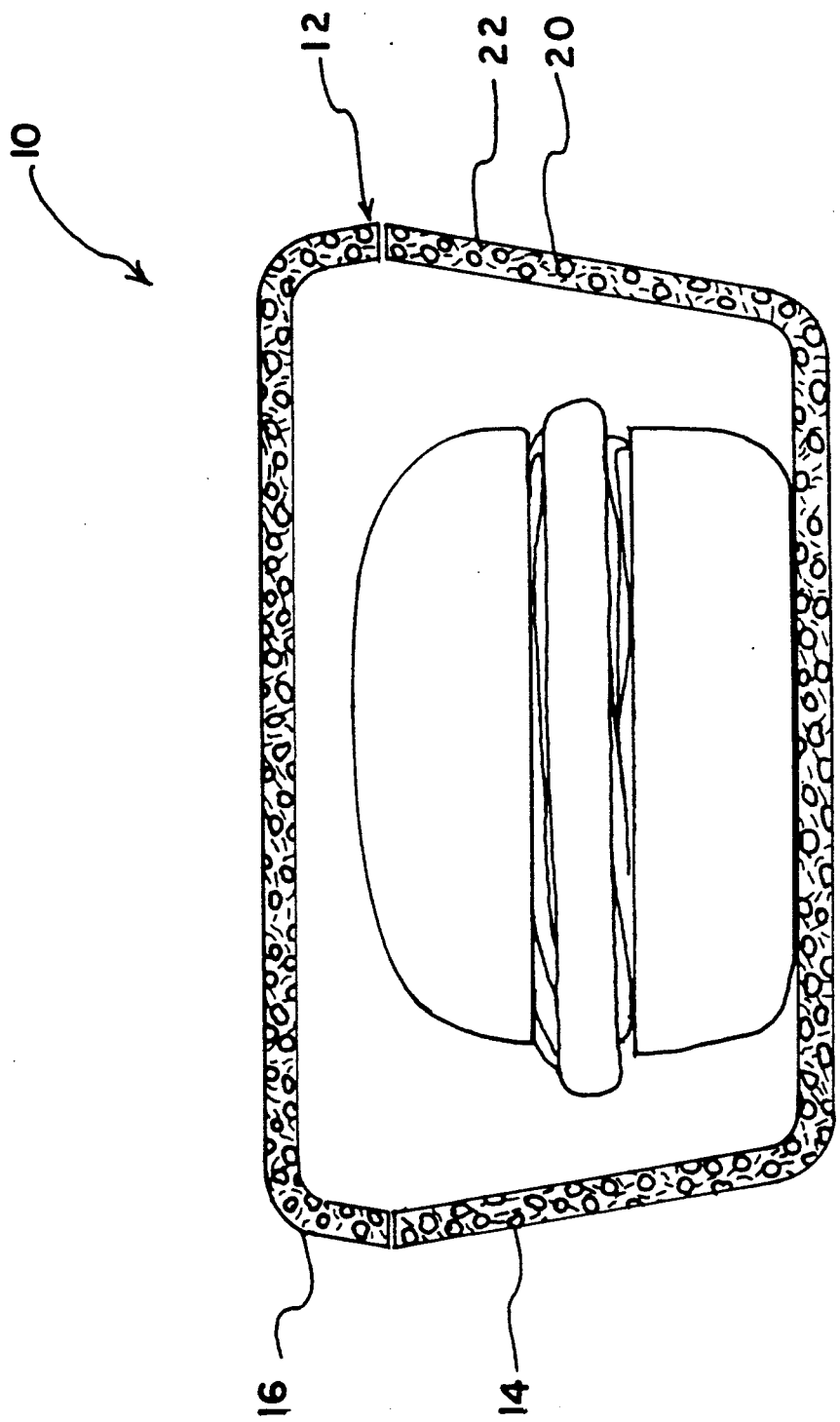
FIG. 1 is a side, cross-sectional view of a preferred embodiment of the biodegradable food container of the present invention showing a sandwich contained therein.

Referring to the drawings, a preferred embodiment of the present invention food container is indicated generally by the numeral 10. Food container 10 can be designed in various sizes and shapes to hold selected foods. The food container 10 shown in FIG. 1 includes a wall structure 12 having a bottom 14 and a top 16 for enclosing a sandwich such as the hamburger.

Wall structure 12 is made from a multiplicity of expandable grains 20 that have been expanded or popped and bound together by a bonding agent 22. The heat-expanded grains 20 bound together by bonding agent 22 can be either whole heat-expanded grains 20 or ground heat-expanded grains 20. As used throughout this specification and claims, references to popped or heat-expanded grains includes both whole heat-expanded grains and ground heat-expanded grains. Heat-expanded grains 20 and bonding agent 22 are both biodegradable to provide for environmentally safe disposal of containers 10 after use.

In the preferred embodiment, the expandable grains 20 are popcorn. Other types of expandable grains 20 such as rice also may be used in alternate embodiments of food container 10. Bonding agent 22 is a food grade paste approved by the Food and Drug Administration (FDA) for direct contact with food. Bonding agents 22 usable in constructing food container 10 include mixtures and compounds of dextrose, starches, starch paste, borated starch paste, borated paste, and similar synthesized material or agents.

Figure 2:
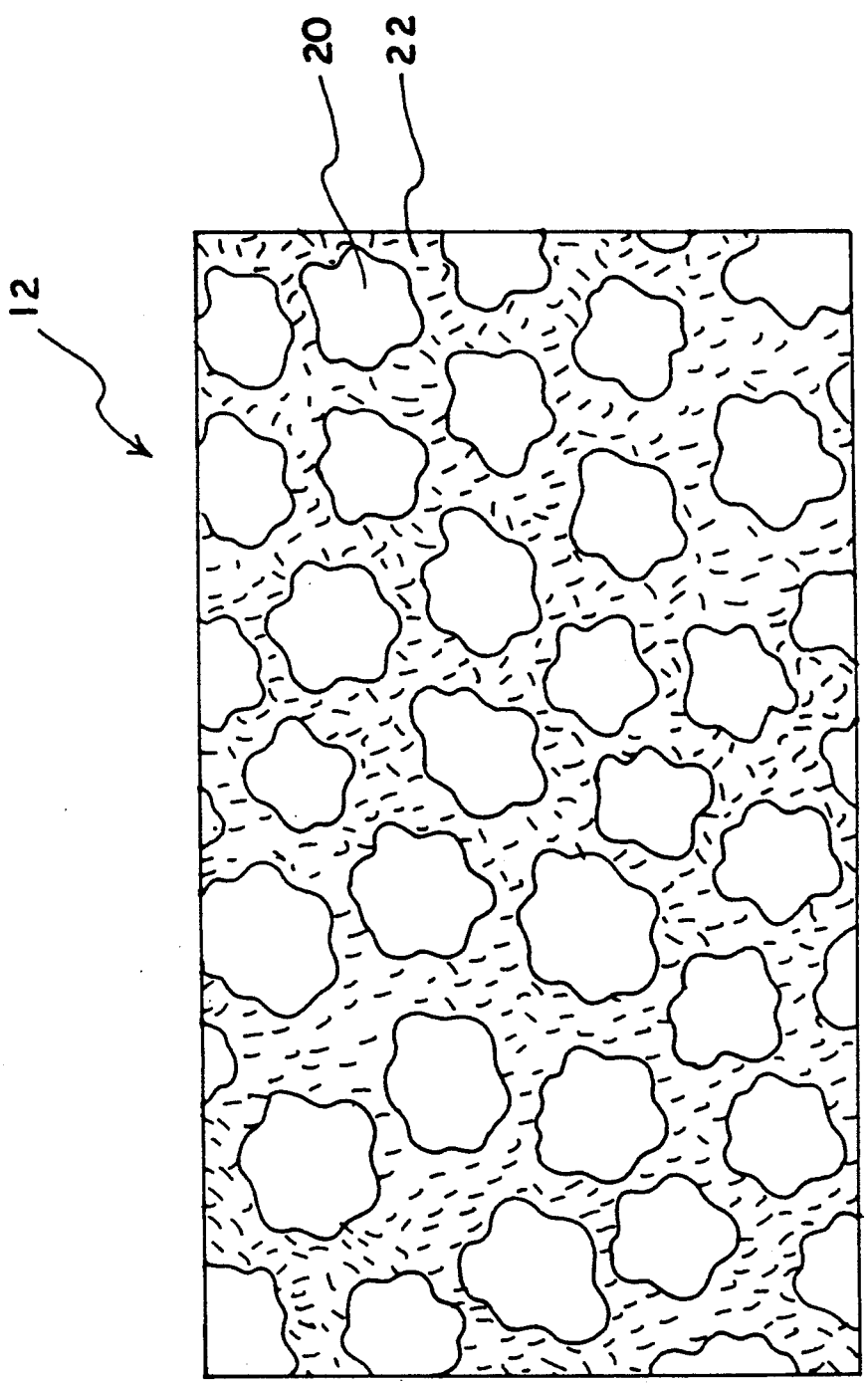
FIG. 2 is a magnified view of a cross-section of the food container's wall structure.

As shown in FIGS. 1 and 2, bonding agent 22 is used to bond heat-expanded grains 20 together to form a framework of spaced, heat-expanded grains 20 extending longitudinally across and along the cross-section of wall structure 12 Bonding agent 22 adheres to grain products 20 intermixed therewith and provides for easy molding of the mixture to form a container 10 of selected shape and size.

Figure 3:
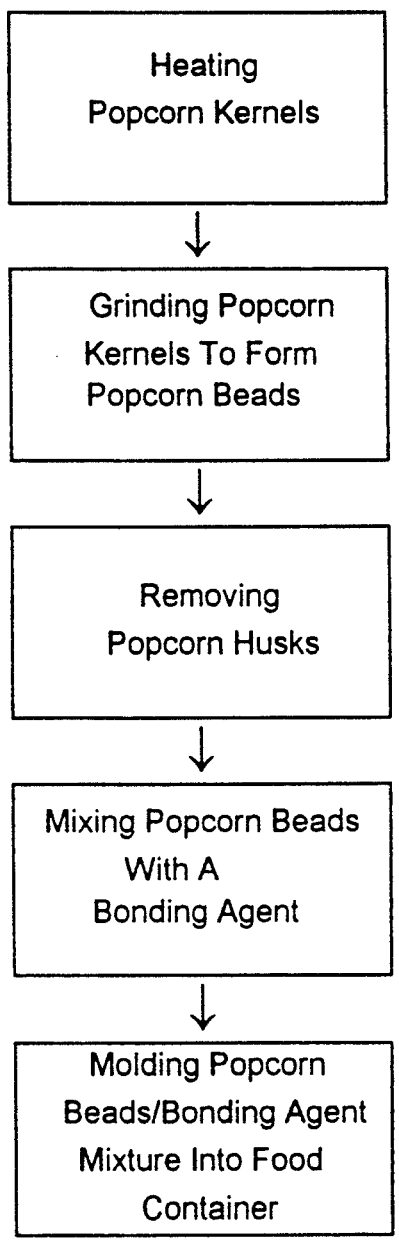
FIG. 3 is a flow chart of a preferred process for forming the food container.

Referring to FIG. 3, the process for constructing a preferred embodiment food container 10 made from popcorn 20 follows. Popcorn kernels are heated such that the kernels expand to form popcorn 20. Popcorn 20 includes an endosperm portion that has air interspersed therethrough and a husk portion. Popcorn 20 is in an expanded state where air is interspersed throughout the endosperm portion of the popcorn 20.

Popcorn 20 is then ground such that the endosperm portion is broken into ground popcorn beads 20 and the husk portion is likewise broken apart. The ground popcorn beads 20 are processed to remove husks from the popcorn beads 20 and to select popcorn beads 20 of a roughly uniform size. Conventional sifting processes can be used to remove the popcorn husks and to select popcorn beads 10 having roughly the same size. The selected popcorn beads 20 are then mixed with bonding agent 22 to form a moldable popcorn mixture. The moldable popcorn mixture is then molded to form wall structure 12 having a selected container shape. Conventional molding processes including casting molding, thermo-molding, extruding can be used to form the moldable popcorn mixture to form wall structure 12.

An alternative embodiment of food container 10 can also be constructed where popcorn 20 is not ground into popcorn beads 20. Instead, whole popcorn 20 is mixed with bonding agent 22 to form a wall structure 12 where whole popcorn 20 is spaced and bond together by bonding agent 22. However, due to the ordinary need for a thin wall structure 12 for food containers 10, popcorn 20 located within wall structure 12 will preferably be composed of primarily ground popcorn 20.

Figure 4:
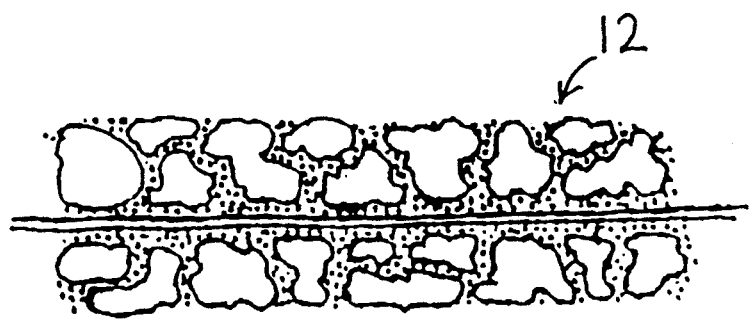
FIG. 4 is a magnified view of a cross-section of a wall structure reinforced by a reinforcing layer of scrim extending through the wall structure.
Figure 5:
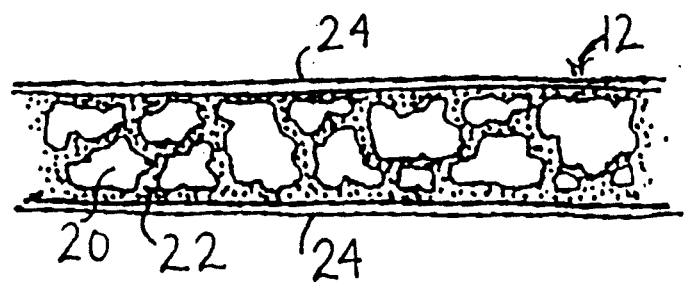
FIG. 5 is a magnified view of a cross-section of a reinforced scrim wall structure having a pair of outer reinforcing layers.
Figure 6:
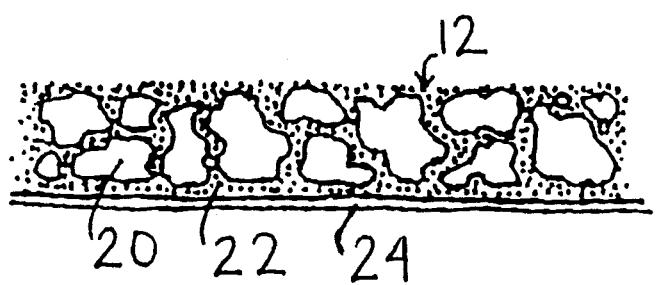
FIG. 6 is a magnified view of a cross-section of a reinforced scrim wall structure having a single reinforcing outer layer.

In another alternative embodiment of the present invention food container 10, a biodegradable reinforcing structure 24 is used to add strength to wall structure 12. See FIGS. 4-6. In the preferred embodiment, reinforcing structure 24 is a layer composed of scrim, which conventionally is a durable plain woven cotton fabric. Layer 24 can be formed in a lattice to add strength to reinforcing structure 24. The layer 24 of scrim can be extended through wall structure 12 to separate wall structure 12 into two or more layers, as shown in FIG. 4, or a scrim layer 24 can be adhered to one or both outer surfaces of wall structure 12, as shown in FIGS. 5 and 6. Wall structure 12 can also be reinforced by intermixing scrim throughout the bonding agent 22 used to form wall structure 12.

Food container 10 constructed, as described above, from expanded grain products 20 and bonding agent 22 makes for an effective food storage and handling structure. Food container 10 can be produced relatively inexpensively due to the low cost of heat-expanded grains 20 and bonding agents 22. In addition, food container 10 has good insulating characteristics due to the heat-expanded grains 20 spaced throughout its wall structure 12. Because the heat-expanded grains beads 20 include interspersed air throughout the heat-expanded grains 20, food container 10 provides good insulation to help maintain a food product at either a hot or cold temperature state. Food container 10 can also be produced in a variety of selected shapes due to the easy moldability of the mixture formed from the bonding agent and heat-expanded grains 20. Accordingly, food container 10 is relatively inexpensive, biodegradable, insulated, and easily produced in a variety of shapes.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A biodegradable food container comprising: a food container having a formed wall structure made up of a plurality of heat-expanded popcorn grains with respective heat-expanded popcorn grains being spaced apart and bound together by a biodegradable bonding agent so as to form a biodegradable wall structure, the biodegradable wall structure having a plurality of heat-expanded popcorn grains extending across the cross-section of the wall structure as well as longitudinally along the wall structure.

2. The biodegradable food container of claim 1 wherein the popcorn that forms a part of the wall structure is made up of ground popcorn beads.

3. The biodegradable food container of claim 2 wherein the wall structure is substantially free of popcorn husks.

4. The biodegradable food container of claim 2 wherein the popcorn beads are of substantially uniform size.

5. The biodegradable food container of claim 1 wherein the bonding agent is of a food-grade quality suitable for direct contact with food.

6. The biodegradable food container of claim 1 wherein the bonding agent is formed substantially from a starch paste.

7. A process for forming a biodegradable food container comprising:
 a) heating popcorn grains to form heat-expanded popcorn grains;
 b) combining the heat-expanded popcorn grains with a bonding agent to form a mixture of spaced-apart, heat-expanded popcorn grains bonded together by the bonding agent; and
 c) forming the popcorn bonding agent mixture into a wall structure having the shape of a food container.

8. The process of claim 7 wherein the bonding agent is formed substantially of a starch paste.

9. The process of claim 7 further including the step of grinding the heat-expanded popcorn grains so as to break the heat-expanded popcorn grains into ground beads.

10. The process of claim 9 further including the step of removing popcorn husks from the popcorn beads before mixing the popcorn beads with the bonding agent.

11. The process of claim 9 further including the step of selectively separating the ground beads into a plurality of substantially, uniformly-shaped ground beads to be mixed with the bonding agent.

12. The process of claim 7 wherein the bonding agent is of a food-grade quality suitable for direct contact with food.

13. The process of claim 8 further including the step of reinforcing the wall structure by adding a biodegradable reinforcing structure to the popcorn grain/bonding agent mixture.

14. The process of claim 8 further including the step of reinforcing the wall structure by adhering a biodegradable reinforcing layer to an outer surface of the wall structure.

15. The process of claim 14 wherein the layer is composed substantially of scrim.

16. The process of claim 13 wherein the biodegradable reinforcing structure is scrim.

17. A process for forming a biodegradable food container comprising:
   a) popping corn grains to form popcorn;
   b) grinding the popcorn into ground beads;
   c) removing popcorn husks from the ground beads to form a mixture of ground beads substantially free of husks;
   d) mixing the ground beads with a biodegradable bonding agent suitable for direct contact with food so as to form a moldable popcorn mixture; and
   e) forming the moldable popcorn mixture into the shape of a container.

18. The process of claim 17 wherein the bonding agent is formed substantially from a starch paste.

19. A biodegradable popcorn food container comprising a food container having a surrounding wall structure comprised of ground popcorn beads, formed by grinding heated and exploded popcorn kernels, bound together by a biodegradable bonding agent, and wherein the ground popcorn beads are substantially free of husks and include air pockets formed therein such that the resulting biodegradable food container walls structure is made up of the ground popcorn beads, air and the bonding agent.

20. The biodegradable food container of claim 17 wherein the popcorn is ground and processed so that ground beads of substantially the same size are located within the wall structure.

21. A biodegradable food container comprising: a food container having a formed wall structure made up of a plurality of heat-expanded popcorn grains with respective heat-expanded popcorn grains being spaced apart and bound together by a biodegradable bonding agent to form a popcorn grain/bonding agent mixture, and the wall structure having a biodegradable reinforcing structure for structurally reinforcing the wall structure of the food container.

22. The biodegradable reinforcing structure of claim 21 wherein the reinforcing structure forms a layer on an outer surface of the popcorn grain/bonding agent mixture.

23. The biodegradable food container of claim 22 wherein the reinforcing structure is formed substantially of scrim.

24. The biodegradable food container of claim 21 wherein the reinforcing structure is intermixed substantially throughout the wall structure.

25. The biodegradable food container of claim 24 wherein the reinforcing structure is formed substantially of scrim.

26. The biodegradable food container of claim 23 wherein the reinforcing structure forms a lattice.

27. The biodegradable food container of claim 23 wherein the reinforcing structure forms opposing outer layers on the wall structure.

* * * * *